(12) United States Patent
Gaya et al.

(10) Patent No.: US 8,028,077 B1
(45) Date of Patent: Sep. 27, 2011

(54) MANAGING DISTRIBUTED COMPUTERS

(75) Inventors: Bruce Gaya, Palo Alto, CA (US); Scott Marcy, Highlands Ranch, CO (US); Chris Parker, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 902 days.

(21) Appl. No.: 10/194,926

(22) Filed: Jul. 12, 2002

(51) Int. Cl.
*G06F 15/16* (2006.01)
*G06F 15/173* (2006.01)
*G06F 15/177* (2006.01)

(52) U.S. Cl. ........ 709/229; 709/203; 709/220; 709/225; 709/226; 709/227; 709/228

(58) Field of Classification Search ............... 709/203, 709/220, 225–229; 707/1, 3, 10, 101, 102; 713/182; 726/27
See application file for complete search history.

(56) References Cited

U.S. PATENT DOCUMENTS

| | | | | |
|---|---|---|---|---|
| 4,916,738 A * | 4/1990 | Chandra et al. | ............... | 713/159 |
| 5,452,239 A * | 9/1995 | Dai et al. | ............... | 703/19 |
| 5,519,831 A * | 5/1996 | Holzhammer | ............... | 714/22 |
| 5,559,984 A * | 9/1996 | Nakano et al. | ............... | 711/121 |
| 5,577,210 A * | 11/1996 | Abdous et al. | ............... | 709/219 |
| 5,689,638 A * | 11/1997 | Sadovsky | ............... | 726/21 |
| 5,781,739 A * | 7/1998 | Bach et al. | ............... | 709/227 |
| 5,864,676 A * | 1/1999 | Beer et al. | ............... | 709/229 |
| 5,878,213 A * | 3/1999 | Bittinger et al. | ............... | 709/203 |
| 5,884,312 A * | 3/1999 | Dustan et al. | ............... | 1/1 |
| 5,964,872 A * | 10/1999 | Turpin | ............... | 713/1 |
| 6,149,441 A * | 11/2000 | Pellegrino et al. | ............... | 434/350 |
| 6,167,513 A * | 12/2000 | Inoue et al. | ............... | 713/150 |
| 6,182,122 B1 * | 1/2001 | Berstis | ............... | 709/217 |
| 6,199,067 B1 * | 3/2001 | Geller | ............... | 707/10 |
| 6,237,092 B1 * | 5/2001 | Hayes, Jr. | ............... | 713/100 |
| 6,339,826 B2 * | 1/2002 | Hayes et al. | ............... | 713/166 |
| 6,369,840 B1 * | 4/2002 | Barnett et al. | ............... | 715/853 |
| 6,374,305 B1 * | 4/2002 | Gupta et al. | ............... | 709/246 |
| 6,535,518 B1 * | 3/2003 | Hu et al. | ............... | 370/401 |
| 6,571,290 B2 * | 5/2003 | Selgas et al. | ............... | 709/228 |
| 6,587,836 B1 * | 7/2003 | Ahlberg et al. | ............... | 705/26.35 |
| 6,594,682 B2 * | 7/2003 | Peterson et al. | ............... | 718/102 |
| 6,597,620 B1 * | 7/2003 | McMinn | ............... | 365/189.09 |
| 6,697,806 B1 * | 2/2004 | Cook | ............... | 1/1 |
| 6,728,760 B1 * | 4/2004 | Fairchild et al. | ............... | 709/217 |
| 6,757,705 B1 * | 6/2004 | Pardikar et al. | ............... | 709/203 |
| 6,772,214 B1 * | 8/2004 | McClain et al. | ............... | 709/229 |
| 6,785,689 B1 * | 8/2004 | Daniel et al. | ............... | 707/754 |
| 6,804,718 B1 * | 10/2004 | Pang et al. | ............... | 709/226 |
| 6,816,880 B1 * | 11/2004 | Stent et al. | ............... | 709/202 |
| 6,871,286 B1 * | 3/2005 | Cagle et al. | ............... | 726/5 |
| 6,917,960 B1 * | 7/2005 | Decasper et al. | ............... | 709/203 |

(Continued)

OTHER PUBLICATIONS

"cache" www.hyperdictionary.com, accessed Mar. 21, 2008.*

*Primary Examiner* — Thu Nguyen
*Assistant Examiner* — Angela Widhalm
(74) *Attorney, Agent, or Firm* — Schwegman, Lundberg & Woessner, P.A.

(57) ABSTRACT

A method, apparatus, system, and signal-bearing medium that in an embodiment provides for a management and resource policy for computers. The policy may control whether users can access or not access local and network software and hardware resources and affects the computer's human interface. A hierarchy of management data may be combined into managed and unmanaged preference data and conflicts within the management data are resolved based on the policy.

67 Claims, 7 Drawing Sheets

U.S. PATENT DOCUMENTS

| | | | |
|---|---|---|---|
| 6,950,818 B2 * | 9/2005 | Dennis et al. | 707/3 |
| 6,954,790 B2 * | 10/2005 | Forslow | 709/227 |
| 6,959,331 B1 * | 10/2005 | Traversat et al. | 709/222 |
| 6,976,066 B1 * | 12/2005 | Mouhanna et al. | 709/223 |
| 7,062,515 B1 * | 6/2006 | Thomas et al. | 711/118 |
| 7,062,545 B1 * | 6/2006 | Donkin et al. | 709/220 |
| 7,072,956 B2 * | 7/2006 | Parupudi et al. | 709/223 |
| 7,086,084 B2 * | 8/2006 | Kappel et al. | 726/4 |
| 7,099,926 B1 * | 8/2006 | Ims et al. | 709/217 |
| 7,130,896 B2 * | 10/2006 | Engel et al. | 709/220 |
| 7,134,139 B2 * | 11/2006 | Hetzler et al. | 726/2 |
| 7,216,149 B1 * | 5/2007 | Briscoe et al. | 709/217 |
| 7,222,150 B1 * | 5/2007 | Phillips et al. | 709/202 |
| 7,225,249 B1 * | 5/2007 | Barry et al. | 709/227 |
| 7,305,562 B1 * | 12/2007 | Bianco et al. | 713/186 |
| 7,546,602 B2 * | 6/2009 | Hejlsberg et al. | 719/313 |
| 2001/0037407 A1 * | 11/2001 | Dragulev et al. | 709/250 |
| 2001/0054084 A1 * | 12/2001 | Kosmynin | 709/218 |
| 2002/0055968 A1 * | 5/2002 | Wishoff et al. | 709/203 |
| 2002/0083073 A1 * | 6/2002 | Vaidya et al. | 707/102 |
| 2002/0091819 A1 * | 7/2002 | Melchione et al. | 709/224 |
| 2002/0099825 A1 * | 7/2002 | Fertell et al. | 709/225 |
| 2002/0156889 A1 * | 10/2002 | Crudele et al. | 709/224 |
| 2003/0046118 A1 * | 3/2003 | O'Donnell | 705/5 |
| 2003/0126136 A1 * | 7/2003 | Omoigui | 707/10 |
| 2005/0102268 A1 * | 5/2005 | Adya et al. | 707/1 |

* cited by examiner

MANAGING DISTRIBUTED COMPUTERS

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to distributed computers and more particularly to the management of distributed computers.

BACKGROUND

Computers are very powerful and versatile. They have the capability to run a great variety of software to perform many functions and to access remote information over a network, such as the Internet. Administrators who manage computers in an organization, such as business or school, recognize that granting all of this unfettered power and options to an individual user may confuse the user and distract the user from the user's assigned or expected task. Thus, administrators may want to (1) limit users to less than the full capabilities of the computer and (2) tailor the user's computer environment to the tasks that the user is anticipated to be doing.

For example, in an education environment, students in a math class should be doing math exercises on the computer, not reading novels or playing games. Thus, when users enter the math class, the administrator would like the computer to be set up (tailored) for the math environment and only the math environment. For example, computer users in math class may need access to math tools, math servers, and math printers. In contrast, in English class, the users might very well be reading novels on the same or a different computer.

Managing distributed computers becomes difficult because, for example, the same computer may be used by multiple users for multiple classes, and one user may move between different computers and different classes, during which time the user's environment needs to be tailored and limited differently.

SUMMARY

A method, apparatus, system, and signal-bearing medium are provided that in an embodiment provides for a management and resource policy for computers. The policy controls whether users can access or not access local and network software and hardware resources and affects the computer's human interface. A hierarchy of management data may be combined into managed and unmanaged preference data and conflicts within the management data may be resolved based on the policy.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures, and techniques have not been shown in detail in order not to obscure the invention.

Figure 1:
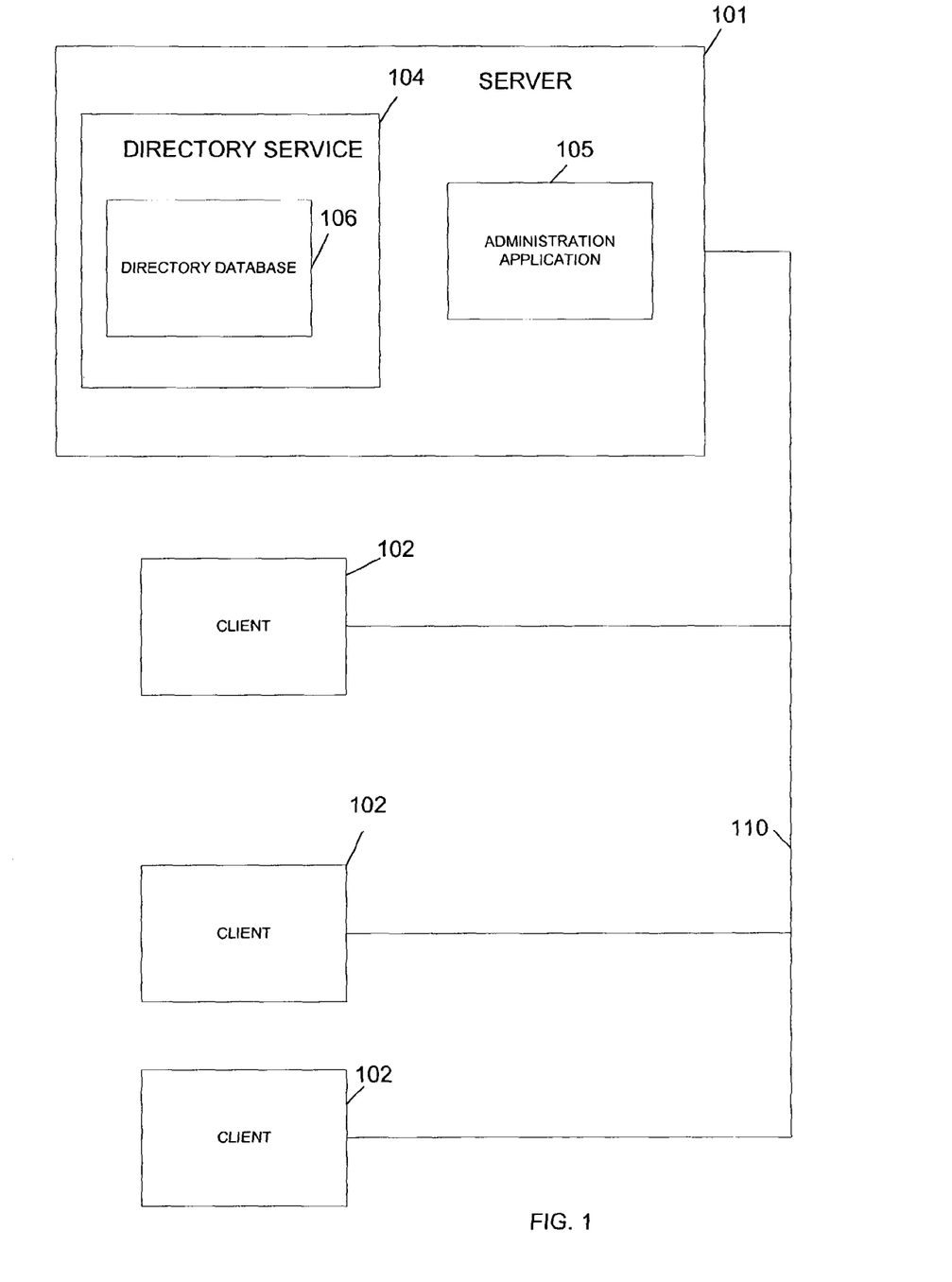
FIG. 1 depicts a block diagram of example components of an embodiment of the invention.

FIG. 1 depicts a block diagram of example components of an embodiment of the invention. One or more server computers 101 host a directory service 104 and a directory database of management information 106 such that they are available to client computers 102 on a network 110. A plurality of client computers 102 are the computers to be managed by an embodiment of this invention. In some embodiments, the client computer 102 may hold the directory database 106 and thus act as a client computer and a server computer at the same time.

The directory service 104 may be the repository of the directory database of management information 106. In an embodiment, the directory database 106 may be made available through the LDAP (Lightweight Directory Access Protocol) database network protocol. But, in other embodiments, any appropriate protocol may be used.

The directory database 106 may include management information composed of policy data and management data. The management data may include a hierarchy of user, location, group, and computer records containing preference data, but in other embodiments any appropriate type of hierarchy and number of levels within the hierarchy may be present. The policy data may include rules for how preference data in the hierarchy is to be combined and rules for how conflicts between the preference data in the hierarchy are to be resolved. The directory storage may be either local to a client computer 102 or reside on a network server 101.

By associating the management information with computer records, users who log into those computers are managed, even if the user records do not have management information, and users may be managed indirectly by managing their computers. The management information is not limited to hardware specific settings. For example, in an embodiment, a web browser home page may be associated with a computer record, and users who log on to that computer and use the web browser will see that page as their home page. This may be especially useful in an embodiment where a user uses the same computer every day with a local account that is not under the control of the directory server administrator, and thus has no management information.

Although the directory database 106 is shown as being included within the server 101, in another embodiment the directory database 106 may also be included in any or all of the clients 102 in which case the combination of the location management information at the client and server management information may be used to control the user's preference settings.

The administration application 105 may be an application program that both creates new records and allows management information to be associated with records in the directory service 104. The administrative program 105 may be run from any client 102 or any server computer 101.

Figure 2:
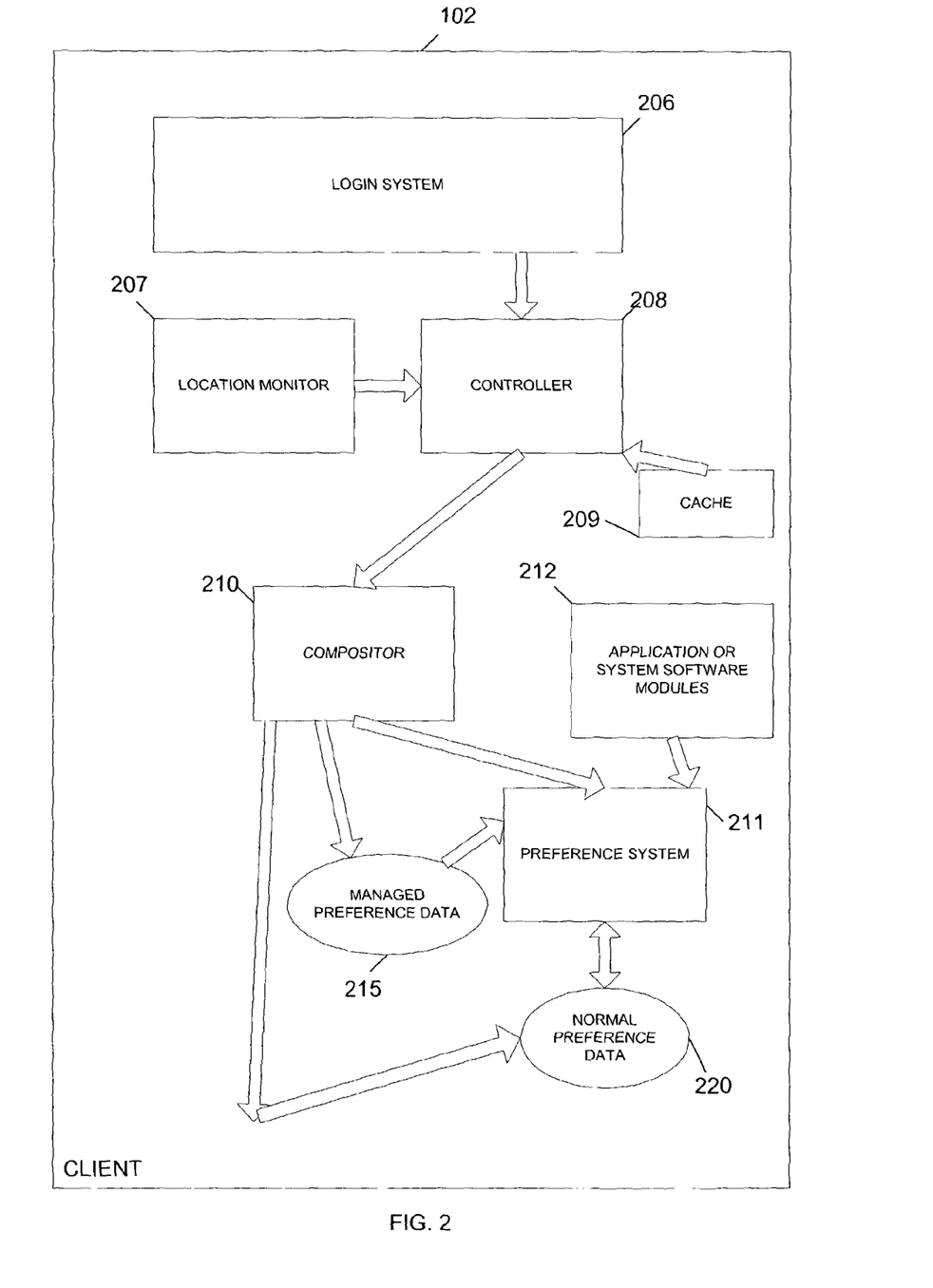
FIG. 2 depicts a block diagram of example components of a client computer, according to an embodiment of the invention.

FIG. 2 depicts a block diagram of example components of the client 102, according to an embodiment of the invention. Login system 206 may be part of the client operating system software. The login system 206 allows users to authenticate and log into the client computer 102. The login system 206 may call the controller 208 at appropriate times during the login process.

The location monitor 207 detects changes in location of the client computer 102 as defined by the operating system's networking software. When a location change is detected, the location monitor 207 calls the controller 208.

The controller 208 detects the current computer, logged-in user, group, and location and retrieves the appropriate management information from the directory service 104 through the cache 209. This information is passed on to the compositor 210.

The cache 209 caches the management information from the directory service 104 for use when the directory service 104 is unavailable, such as when a mobile client computer disconnects from the network 110. The cache 209 may also provide a data lifetime based on a management policy and the ability to flush the cache 209 under remote administrative direction. The cache 209 enables the client 102 to still find its management information and thus its hierarchy of computer, location, and workgroup information even when the directory service 104 is unavailable, which may often be the case especially in an embodiment where the client 102 is mobile.

The compositor 210 takes the management information provided by the controller 208 and combines it into managed preference data 215 and normal preference data 220, resolving any conflicts between the preference data and taking management policy into account. Managed preference data 215 may include preference data that the user is not allowed to change. Normal preference data 220 is may include preference data that the user is allowed to change. The compositor 210 also informs the preference system 211 that managed preference data 215 is available. The preference data may include any type of configuration data. In some embodiments, the preference data may tailor, customize, limit the capability of, set up, or configure the client 102, the operating environment of the client 102, the software that runs on the client 102, or the way in which the client 102 interacts with the network 110 or the server 101.

The preference system 211 is part of the client operating system software and normally makes preference data available to the application or system software 212. Managed preference data 215 is not modifiable and is given priority over normal preference data 220. The preference system 211 allows applications and system software 212 to read and write preferences to standard locations in the file system in a standardized format. The preference system 211 inserts unmodifiable managed preference data, so that the applications and system software 212 reading preference data receives the managed preference data. This is done at a fine level of granularity so that applications or system software 212 may receive a mix of both managed and normal preference data.

The preference system 211 also allows application and system software 212 to discover if management is active. The preference system 211 also allows application and system software 212 to distinguish between managed preference data 215 and normal preference data 220. Being able to distinguish between managed and normal preference data enables user interfaces to reflect that certain user interface elements may not be used or that certain data may not be changed. For example, in an embodiment, user interface elements that are not allowed to be accessed may be grayed out, disabled, or removed from the interface.

The preference system 211 also notifies the application and system software 212 that preference data has changed. This is especially useful in handling preferences changes that result from changes in the location of the client 102. As a result of the preference system 211 functions, when the location changes, the compositor 210 may make managed preference data 215 available to application and system software 212 running on the client computer 102.

The preference system 211 also temporarily adds the managed preference data 215, so that the normal preference data 220 is still be available and unmodified when management is removed. Thus, the managed preference data is only in effect when the user is in the hierarchical environment (e.g., within a context of computer, location, workgroup, and user) that generated the data.

System and application software 212 consumes managed preference data 215 and normal preference data 220 through the preference system 211 and thus are controlled by administrative management policy.

Figure 3:
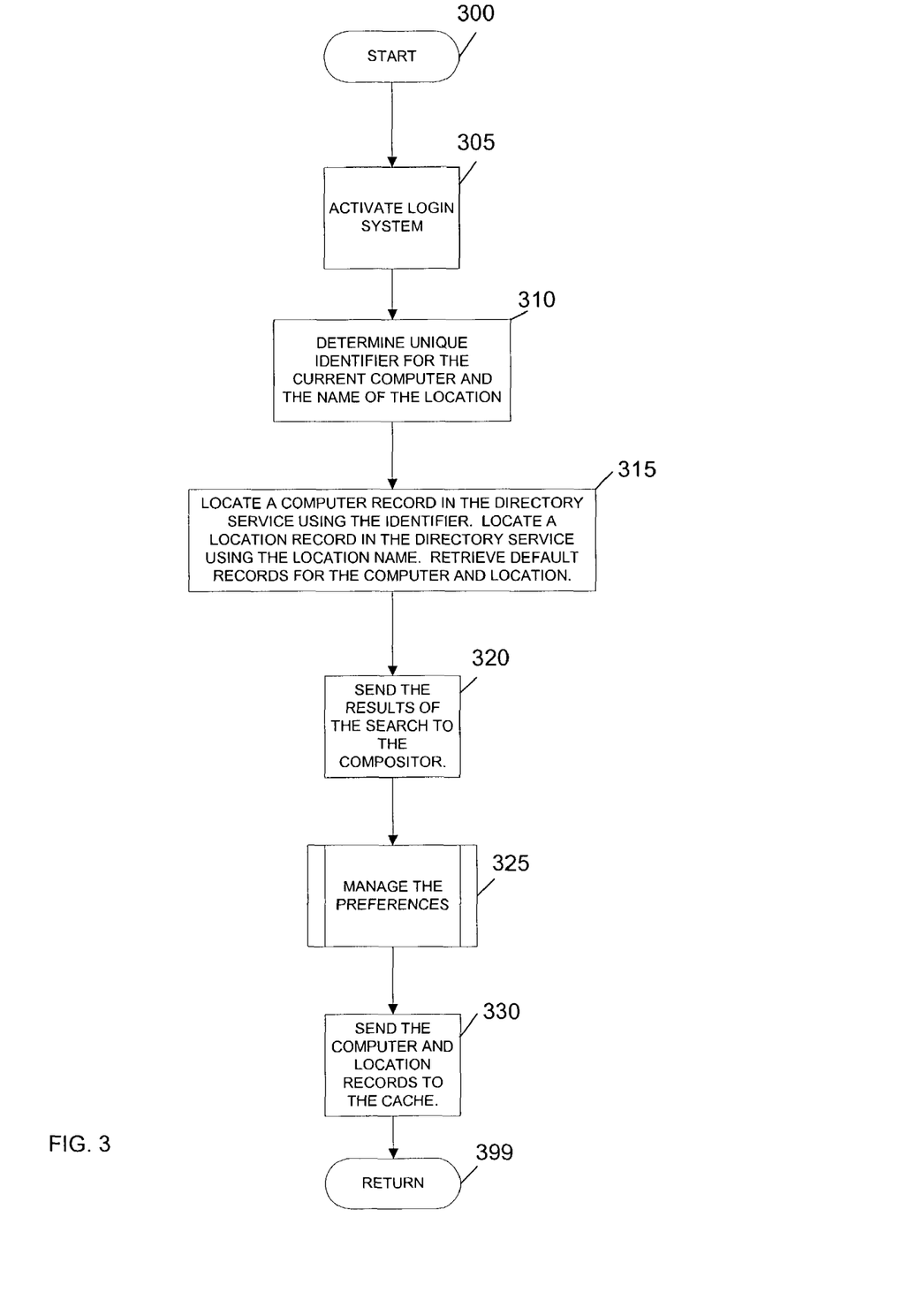
FIG. 3 depicts a flowchart of example processing for startup preference management, according to an embodiment of the invention.

FIG. 3 depicts a flowchart of example processing for startup preference management, according to an embodiment of the invention. Before startup preference management begins, the proper system software is installed on the server 101 and the client 102, and they are attached to the network 110. In an embodiment, the administration application 105 then populates the directory service 104 with user, group, computer, and location records and assigns management information to those records. But, in other embodiments any appropriate type of records may be added to the directory service 104. The system is then ready to be used by client computers 102.

Control begins at block 300 where the client computer 102 starts. Control then continues to block 305 where the client computer 102 activates the login system 206. (The login system may also be activated after client log out.) Control then continues to block 310 where the login system 206 calls the controller 208, which determines a unique identifier for the current computer 102 and also determines the name of the computer's current location, as known to the client computer's operating system. Control then continues to block 315 where the controller 208 uses the unique identifier of the client computer 102 to locate a computer record in the directory service 104 with the same identifier. The controller 208 also uses the location name to locate a location record in the directory service 104 with the same name. In addition, the controller 208 retrieves any default records for the computer and location. All records may be accessed through the cache 209. If these records are found, management information associated with the records is retrieved. Control then continues to block 320 where the entire results of this search, positive or negative, are sent to the compositor 210.

Control then continues to block 325 where the compositor 210 in combination with the preference system 211 and application and system software 112 manages the preferences as further described below with reference to FIG. 6 and as previously described above with reference to FIG. 2. Preference management at login startup time allows the ability to manage the appearance and function of the soon-to-be-displayed login window of the client computer 102.

Control then continues to block 330 where the controller 208 sends to the cache 209 the current computer and location records. The cache 209, running concurrently the system's login window, checks on the age of any previously cached computer and location records. If these records are out-of-date, the cache 209 reads fresh copies of these records plus any related records or reasonably anticipated records (including any management information) into the cache 209 for future use.

Figure 4:
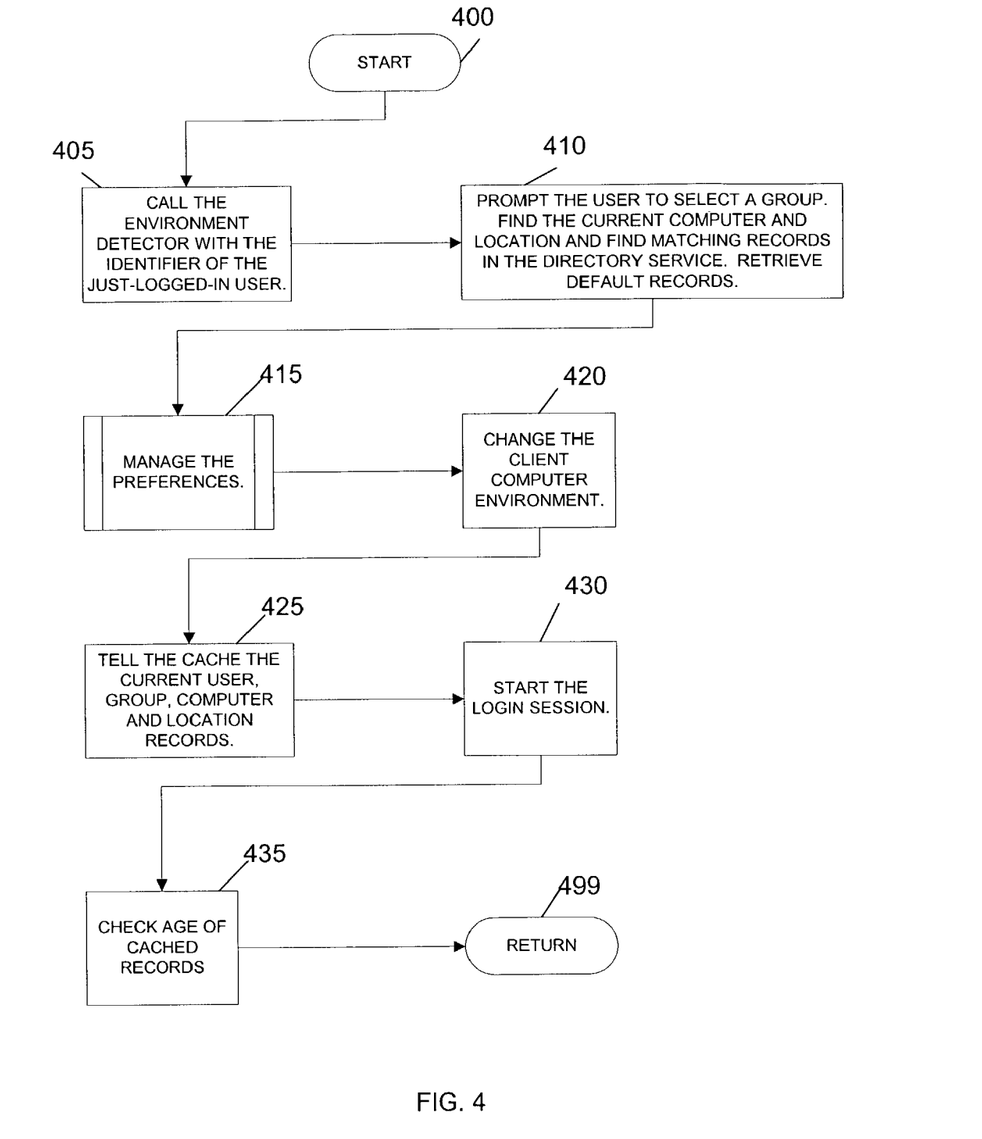
FIG. 4 depicts a flowchart of example processing for login preference management, according to an embodiment of the invention.

FIG. 4 depicts a flowchart of example processing for login preference management, according to an embodiment of the invention. Control begins at block 400.

Control then continues to block 405 where, after the user completes the authentication process, the login system 206 calls the controller 208 with the unique identifier of the just-logged-in user.

Control then continues to block 410 where, to find a preferred group, the controller 208 prompts the user through an interactive window to select a group from among the user's group memberships. The current computer and location are again found, and these along with the current user and group are used to find matching records in the Directory Service 104 and extract any management information associated with those records. In addition, the controller 208 retrieves any default records for the user, group, computer and location. (All records may be accessed through the cache 209.) The entire results of this search, positive or negative, are sent to the compositor 210.

Control then continues to block 415 where the compositor 210 in combination with the preference system 211 and application and system software 212 manages the preferences, as further described below with reference to FIG. 6 and as previously described above with reference to FIG. 2.

After the compositor 210 has finished, control continues to block 420 where the controller 208 now makes special-purpose changes to the overall client computer environment. This allows management of client computer settings that do not affect the user client's preference system 211 (for example, low-level network settings).

Control then continues to block 425 where the compositor 210 tells the cache 209 the current user, group, computer, and location records. Control then continues to block 430 where the login system 206 starts the user's login session.

Control the continues to block 435 where the cache 209, running concurrently with user processes, checks on the age of any previously cached records. If these records are out-of-date, the cache 209 reads fresh copies of these records plus any related records or reasonably anticipated records (including any management information) into the cache 209 for future use. Control then continues to block 499 where the function returns.

Figure 5:
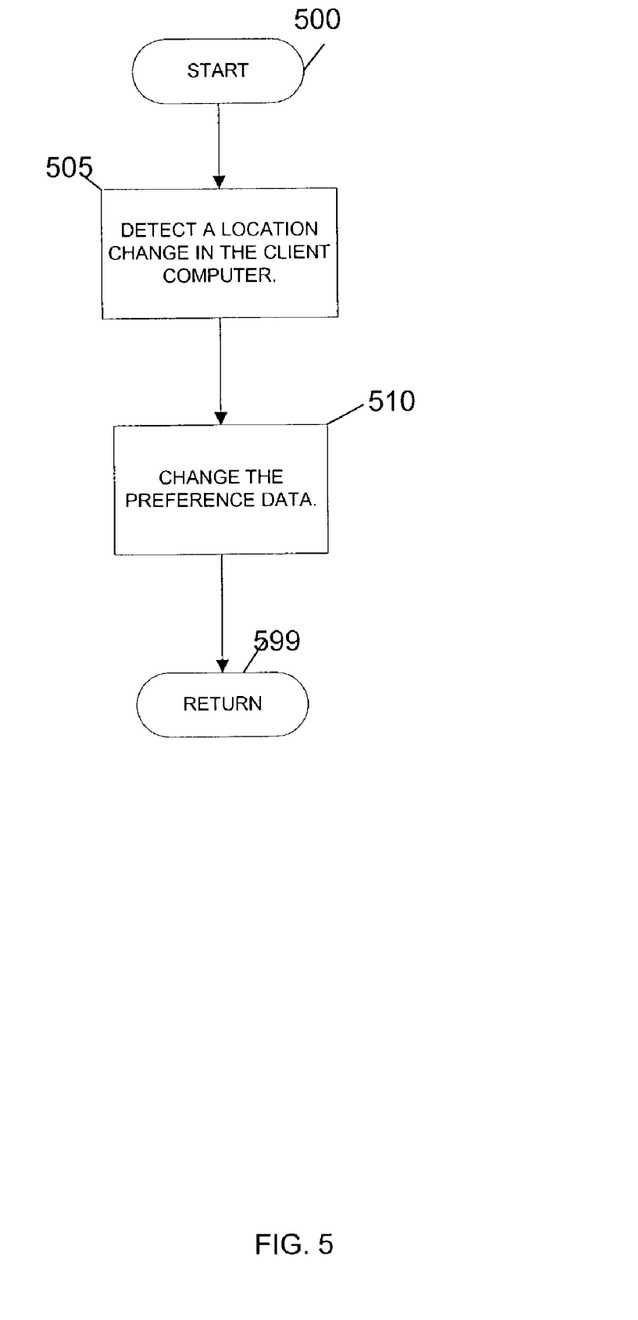
FIG. 5 depicts a flowchart of example processing for a location monitor, according to an embodiment of the invention.

FIG. 5 depicts a flowchart of example processing for the location monitor 207, according to an embodiment of the invention. Control begins at block 500.

Control then continues to block 505 where the location monitor 207 detects a change in location of the client computer 102 and calls the controller 208. If the client computer 102 is a mobile computer, the physical location of the client computer 102 may change at any time. But, since most mobile computers do not have any geographic location sensing hardware the location monitor 207 monitors changes in the computer's networking environment. These may be caused by actual environmental changes, such as entering the area of a wireless network, or by the user changing the computer's network settings. For example, in the Macintosh OSX operating system version 10.2, the network settings may be changed via the Location menu. But, in other operating systems any appropriate interface may be used to change the computer's network settings.

Control then continues to block 510 where the managed preference data 215 and/or the normal preference data 220 are changed to reflect the change in the location of the client computer 102. Since the administration application 105 allows management information to be associated with location records in the directory service 104, the result is that the preferences change when the physical location of the client computer 102 changes. To ensure that out-of-date preference data is not used, the preference system 211 employs a notification system, so that the new preference data is used by the application or system software 412 immediately.

Control then continues to block 599 where the function returns.

Figure 6:
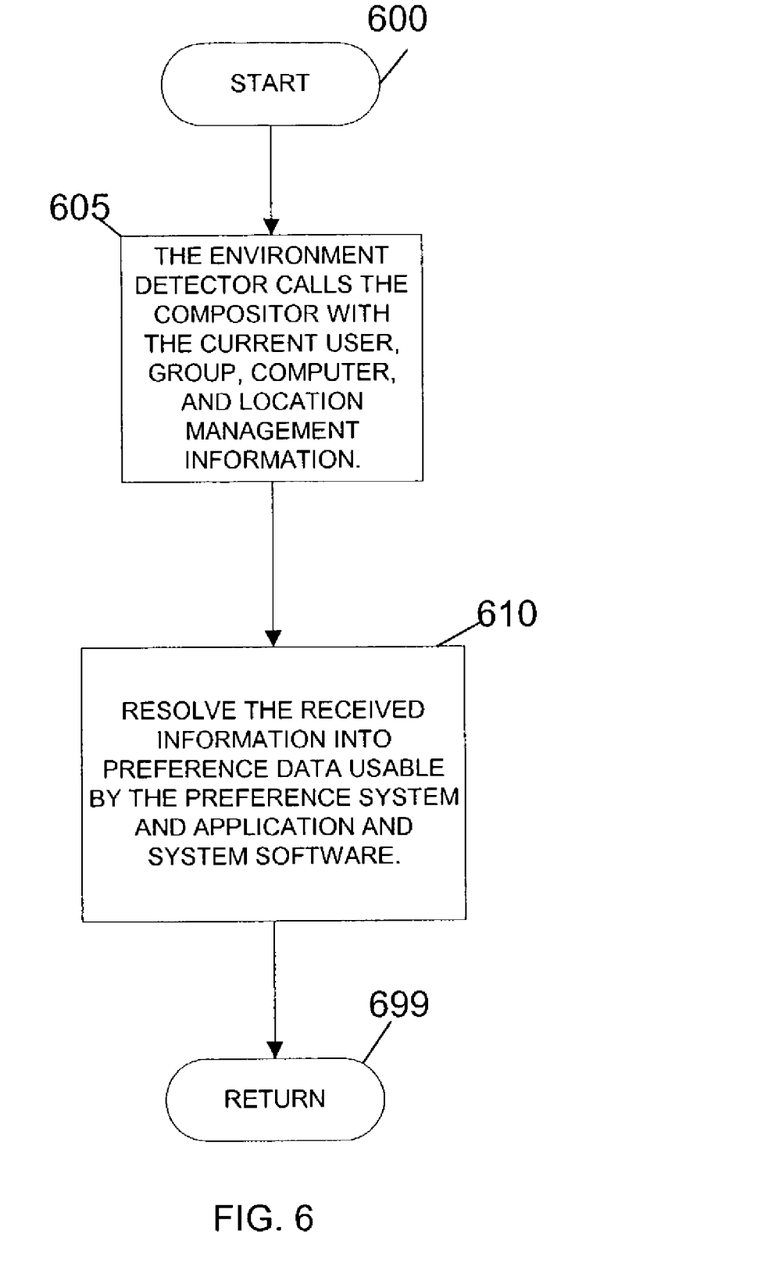
FIG. 6 depicts a flowchart of example processing for a compositor, according to an embodiment of the invention.

FIG. 6 depicts a flowchart of example processing for the compositor 210, according to an embodiment of the invention. Control begins at block 600. Control then continues to block 605 where the controller 208 calls the compositor 210 with the current user, group, computer, and location management information.

Control then continues to block 610 where the compositor 210 resolves this information into preference data usable by the preference system 211 and the application or system software 212. This is necessary because the management information from these records may be different or even conflicting. Part of the management information contains policy data that guides compositor 210 operation. At a high-level, the policy allows certain management information to override (take precedence over) other management information or be selectively combined to produce the union of various settings. In addition, the compositor 210 may designate default management information to be applied if no other applicable management is found. In addition, the management information can instruct the compositor 210 to either create temporary unmodifiable managed preference data or change the normal preference data. Temporary managed preference data is only in effect when the user is in the hierarchical environment (e.g., within a context of computer, location, workgroup, and user) that generated the data. Control then continues to block 699 where the function returns.

Figure 7:
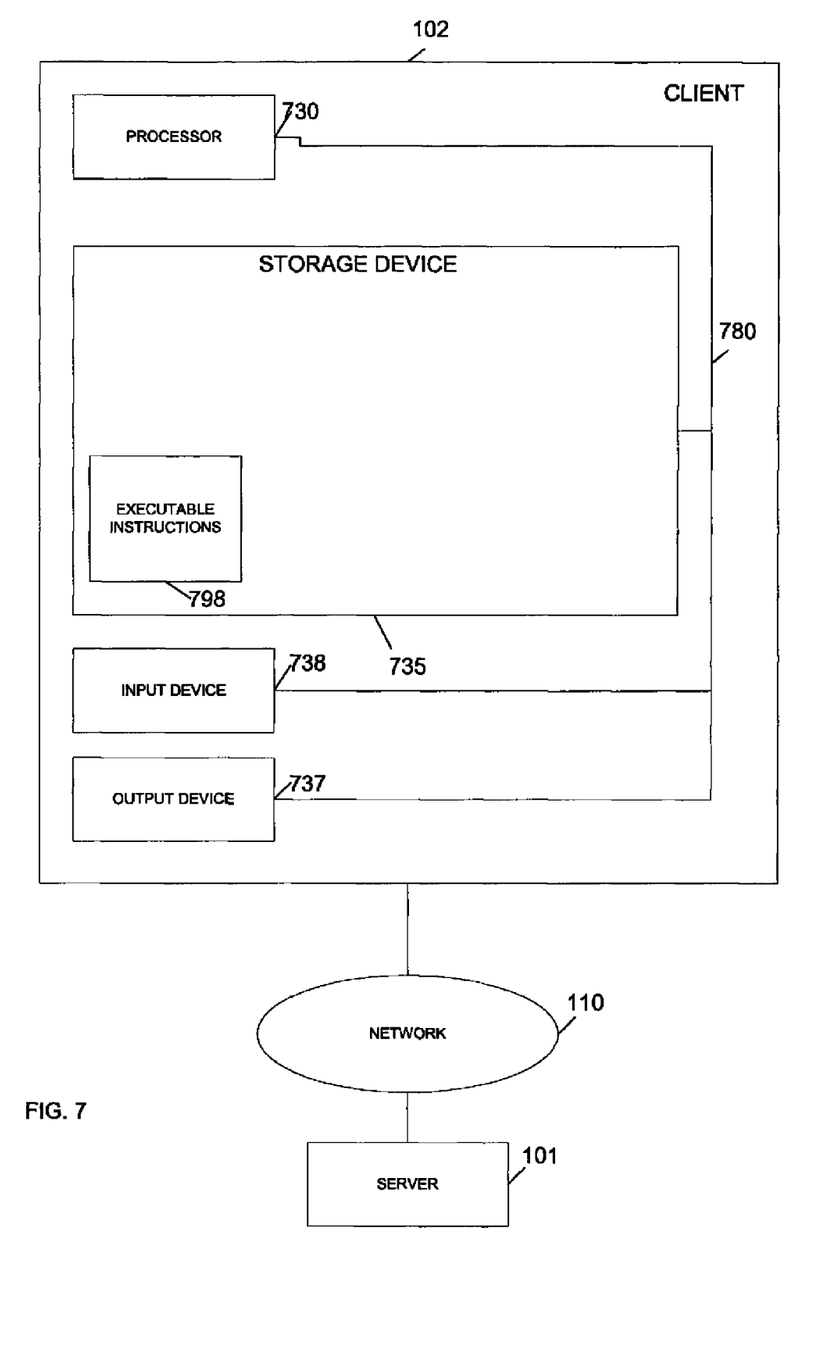
FIG. 7 depicts a block diagram of a system for implementing an embodiment of the invention.

FIG. 7 depicts a detailed block diagram of a system for implementing an embodiment of the invention. Illustrated are a client 102 connected to a server 101 via a network 110. Although one client 102, one server 101, and one network 110 are shown, in other embodiments any number or combination of them may be present. The client 102 may include a processor 730, a storage device 735, an output device 737, and an input device 738, all connected via a bus 780.

The processor 730 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 730 may execute instructions and may include that portion of the client 102 that controls the operation of the entire computer. Although not depicted in FIG. 4, the processor 730 typically includes a control unit that organizes data and program storage in memory and transfers data and other information between the various parts of the client 102. The processor 730 may receive input data from the input device 738 and the network 110, may read and store code and data in the storage device 735, and may present data to the output device 737 and the network 110.

Although the client 102 is shown to contain only a single processor 730 and a single bus 780, the present invention applies equally to computers that may have multiple processors and to computers that may have multiple buses with some or all performing different functions in different ways.

The storage device 735 represents one or more mechanisms for storing data. For example, the storage device 735 may include read only memory (ROM), random access memory (RAM), magnetic disk storage media, optical storage media, flash memory devices, and/or other machine-readable media. In other embodiments, any appropriate type of storage device may be used. Although only one storage device 735 is shown, multiple storage devices and multiple types of storage devices may be present. Further, although the client 102 is drawn to contain the storage device 735, it may be distributed across other computers, for example on server 101.

The storage device 735 may instructions 798 capable of being executed on the processor 730 to carry out the functions of the present invention, as previously described above with reference to FIGS. 1-6. In another embodiment, some or all of the functions of the present invention may be carried out via hardware in lieu of a processor-based system. Of course, the storage device 735 may also contain additional software and data (not shown).

Although the instructions 798 are shown to be within the storage device 735 in the client 102, some or all of the instructions 798 may be distributed across other systems, for example on the server 101 and accessed via the network 110.

The output device 737 is that part of the client 102 that communicates output to the user. The output device 737 may be a cathode-ray tube (CRT) based video display well known in the art of computer hardware. But, in other embodiments the output device 737 may be replaced with a liquid crystal display (LCD) based or gas, plasma-based, flat-panel display. In still other embodiments, any appropriate display device may be used. In yet another embodiment, a speaker may be used. Although only one output device 737 is shown, in other embodiments, any number of output devices of different types or of the same type may be present. In another embodiment, the output device 737 may not be present.

The input device 738 may be a keyboard, mouse, trackball, touchpad, touchscreen, keypad, microphone, voice recognition device, or any other appropriate mechanism for the user to input data to the client 102. Although only one input device 738 is shown, in another embodiment any number and type of input devices may be present.

The bus 780 may represent one or more busses, e.g., PCI, ISA (Industry Standard Architecture), X-Bus, EISA (Extended Industry Standard Architecture), or any other appropriate bus and/or bridge (also called a bus controller).

The client 102 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, and mainframe computers are examples of other possible configurations of the client 102. The hardware and software depicted in FIG. 7 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 110 may be any suitable network and may support any appropriate protocol suitable for communication between the server 101 and the client 102. In an embodiment, the network 110 may support wireless communications. In another embodiment, the network 110 may support hard-wired communications, such as a telephone line or cable. In another embodiment, the network 110 may support the Ethernet IEEE (Institute of Electrical and Electronics Engineers) 802.3x specification. In another embodiment, the network 110 may be the Internet and may support IP (Internet Protocol). In another embodiment, the network 110 may be a local area network (LAN) or a wide area network (WAN). In another embodiment, the network 110 may be a hotspot service provider network. In another embodiment, the network 110 may be an intranet. In another embodiment, the network 110 may be a GPRS (General Packet Radio Service) network. In another embodiment, the network 110 may be any appropriate cellular data network or cell-based radio network technology. In another embodiment, the network 110 may be an IEEE 802.11B wireless network. In still another embodiment, the network 110 may be any suitable network or combination of networks. Although one network 110 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

What is claimed is:

1. A method of managing at least one client computer on a network, comprising the acts of:
   managing a client computer, under the control of the client computer, using information retrieved from the network such that the client computer is operable to manage the information when disconnected from the network, the managing including:
   determining, in the client computer, a unique identifier for the client computer in response to activating a login system of the client computer, the unique identifier being unique to the client computer such that the unique identifier is determinable before user login on the client computer;
   determining, under the control of the client computer, location information for the client computer;

locating, under the control of the client computer, a first record in a directory service of a server via the network, the first record associated with the unique identifier for the client computer, the server separate from the client computer, the client computer operating connected to the network;

retrieving the first record into the client computer from the network such that the first record is received from the network into the client computer through a cache of the client computer such that the cache operates as a first source of the first record and other records retrieved from the network for use in and by the client computer;

locating, under the control of the client computer, a second record associated with the location information, wherein each of the first and second records comprises preference data;

locating, under the control of the client computer, management information associated with the first and second records, wherein the management information includes policy data;

combining, in the client computer, the preference data from the first and second records into managed preference data that a user is not allowed to change and unmanaged preference data that a user is allowed to change, based on the policy data;

sending, internally in the client computer, current computer records and location records of the client computer to the cache following the combining of the preference data, while connected to the network prior to user login on the client computer, such that the cache, running concurrently a login window of the client computer, operates on the current computer and location records in the cache; and managing, in the client computer, the client computer through use of said managed preference data and said unmanaged preference data.

2. The method of claim 1, wherein the combining further comprises resolving conflicts among the preference data in accordance with the policy data.

3. The method of claim 1, further comprising:
detecting that location of the client computer has changed;
locating a third record based, at least in part, on location information that corresponds to the changed location of the client computer and locating management information associated with the third record; and
updating the preference data with preference data of the third record based, at least in part, on the management information associated with the third record.

4. The method of claim 1, further comprising:
detecting that the client computer has disconnected from the network; and
updating the unmanaged preference data in response to the detecting.

5. The method of claim 1, further comprising:
notifying an application of the managed preference data and the unmanaged preference data.

6. The method of claim 5, further comprising:
changing access to a user-interface element in response to the notifying.

7. The method of claim 6, wherein the changing access further comprises:
enabling access to the user-interface element for an item in the unmanaged preference data.

8. The method of claim 6, wherein the changing access further comprises:
disabling access to the user-interface element for an item in the managed preference data.

9. The method of claim 1, wherein the combining further comprises retrieving and utilizing default preference data.

10. The method of claim 1, wherein the unmanaged preference data is unmodified when the managed preference data is removed.

11. The method of claim 1, further comprising:
removing the managed preference data when the management information changes.

12. An apparatus for managing at least one client computer on a network, comprising:
means for determining, in the client computer, a unique identifier for the client computer in response to activating a login system of the client computer, the unique identifier being unique to the client computer such that the unique identifier is determinable before user login on the client computer;
means, in the client computer, for determining location information for the client computer;
means, in the client computer, for locating a first record in a directory service of a server via the network, the first record associated with the unique identifier for the client computer and for locating a second record associated with the location information and for locating management information associated with the first and second records, wherein each of the records comprise preference data and the management information includes policy data, the server separate from the client computer;
a cache in the client computer, the cache configured to receive the first record from the network such that the first record is received from the network into the client computer through the cache of the client computer such that the cache operates as a first source of the first record received from the network for use in and by the client computer, the cache configured to receive, from internally in the client computer, computer records and current location records of the client computer following combining the preference data from the first and second records prior to user login on the client computer, while connected to the network, such that the cache is operable to run concurrently a login window of the client computer and operate on the current computer and location records in the cache;
means, in the client computer, for combining the preference data from the first and second records into managed preference data that a user is not allowed to change and unmanaged preference data that a user is allowed to change, based on the policy data; and
means, in the client computer, for managing the client computer through use of said managed preference data and said unmanaged preference data, wherein all records, acquired from the network, that correspond to preference data for managing the client computer, in the client computer, are received from the network into the client computer through the cache of the client computer such that the cache operates as a first source of the records received from the network for use in and by the client computer.

13. The apparatus of claim 12, wherein the means for combining further comprises means for resolving a conflict among the preference data in accordance with the policy data.

14. The apparatus of claim 12, further comprising:
means for detecting that location of the client computer has changed;

means for locating a third record based, at least in part, on location information that corresponds to the change location of the client computer and for locating management information associated with the third record; and updating the preference data with preference data of the third record based, at least in part, on the management information associated with the third record.

15. The apparatus of claim 12, further comprising:

means for detecting that the hierarchy of management data has changed; and means for notifying an application of the managed preference data and the unmanaged preference data in response to the detecting.

16. The apparatus of claim 15 further comprising:

means for changing access to a user-interface element in response to the notifying.

17. The apparatus of claim 16, wherein the means for changing access further comprises:

means for enabling access to the user-interface element for an item in the unmanaged preference data.

18. The apparatus of claim 16, wherein the means for changing access further comprises:

means for disabling access to the user-interface element for an item in the managed preference data.

19. The apparatus of claim 12, wherein the means for combining further comprises means for retrieving and utilizing default preference data.

20. The apparatus of claim 12, wherein the unmanaged preference data is unmodified when the managed preference data is removed.

21. The apparatus of claim 12, further comprising:

means for removing the managed preference data when the management information changes.

22. A signal-bearing non-transitory storage medium encoded with instructions, wherein the instructions when executed comprise:

determining, in a client computer, a unique identifier for the client computer attached to a network in response to activating a login system of the client computer, the unique identifier being unique to the client computer such that the unique identifier is determinable before user login on the client computer;

determining, under the control of the client computer, location information for the client computer;

locating, under the control of the client computer, a first record in a directory service of a server via the network, the first record associated with the unique identifier for the client computer, the server separate from the client computer, the client computer operating connected to the network;

retrieving the first record into the client computer from the network such that the first record is received from the network into the client computer through a cache of the client computer;

locating, under the control of the client computer, a second record associated with the location information, wherein each of the first and second records comprises preference data;

locating, under the control of the client computer, management information associated with the first and second records, wherein the management information includes policy data;

combining, in the client computer, the preference data from the first and second records into managed preference data that a user is not allowed to change and unmanaged preference data that a user is allowed to change, based on the policy data;

managing, in the client computer, the client computer through use of said managed preference data and said unmanaged preference data, wherein all records, acquired from the network, that correspond to preference data for managing the client computer, in the client computer, are received from the network into the client computer through the cache of the client computer such that the cache operates as a first source of the records acquired from the network for use in and by the client computer; and sending, internally in the client computer, current computer records and location records of the client computer to the cache following the combining of the preference data, while connected to the network prior to user login on the client computer, such that the cache, running concurrently a login window of the client computer, operates on the current computer and location records in the cache.

23. The signal-bearing non-transitory storage medium of claim 22, wherein the combining further comprises resolving conflicts among the preference data in accordance with the policy data.

24. The signal-bearing non-transitory storage medium of claim 22, wherein the instructions further comprise:

detecting that location of the client computer has changed;

locating a third record based, at least in part, on location information that corresponds to the changed location of the client computer and locating management information associated with the third record; and updating the preference data with preference data of the third record based, at least in part, on the management information associated with the third record.

25. The signal-bearing non-transitory storage medium of claim 22, wherein the instructions further comprise:

detecting that the client computer has disconnected from the network; and updating the unmanaged preference data in response to the detecting.

26. The signal-bearing non-transitory storage medium of claim 22, further comprising:

notifying an application of the managed preference data and the unmanaged preference data.

27. The signal-bearing non-transitory storage medium of claim 26, further comprising:

changing access to a user-interface element in response to the notifying.

28. The signal-bearing non-transitory storage medium of claim 27, wherein the changing access further comprises:

enabling access to the user-interface element for an item in the unmanaged preference data.

29. The signal-bearing non-transitory storage medium of claim 27, wherein the changing access further comprises:

disabling access to the user-interface element for an item in the managed preference data.

30. A computer, comprising:

one or more processors; and a storage device coupled to the one or more processors, wherein the storage device comprises instructions that, when executed on the one or more processors, perform operations that comprise:

determining, in the computer, a unique identifier for the computer in response to activating a login system of the computer, the unique identifier being unique to the computer such that the unique identifier is determinable before user login on the computer, the computer operable as a client on a network;

locating, under the control of the computer, in a directory service of a server, via the network with the computer operating connected to the network, the server separate from the computer, a first record associated with the computer, a second record associated with location information of the computer, and management information associated with the records, wherein the records each comprise preference data and wherein the management information includes policy data;

retrieving the first record, the second record, and the management information into the computer from the network such that the first record, the second record, and the management information are received from the network into the computer through a cache of the computer such that the cache operates as a first source of the first record, the second record, and the management information received from the network for use in and by the client computer;

combining, in the computer, the preference data from the first and second records into managed preference data that a user is not allowed to change and unmanaged preference data that a user is allowed to change, based on the policy data; and sending, internally in the computer, current computer records and location records of the computer to the cache following the combining of the preference data, while connected to the network prior to user login on the client computer, such that the cache, running concurrently a login window of the computer, operates on the current computer and location records in the cache.

31. The computer of claim 30, wherein the operations further comprise:
prohibiting the user from changing the managed preference data.

32. The computer of claim 30, wherein the operations further comprise:
allowing the user to change the unmanaged preference data.

33. The computer of claim 30, wherein the combining further comprises performing a union of the preference data.

34. The computer of claim 30, wherein the combining further comprises resolving a conflict in the preference data based on the policy.

35. The computer of claim 30, wherein the combining further comprises retrieving and utilizing default preference data.

36. The computer of claim 30, wherein the unmanaged preference data is unmodified when the managed preference data is removed.

37. The computer of claim 30, wherein the operations further comprise:
detecting that a location of the computer has changed; and
updating the unmanaged preference data in response to the detecting.

38. The computer of claim 30, wherein the operations further comprise:
detecting that the computer has disconnected from the network; and
updating the unmanaged preference data in response to the detecting.

39. The computer of claim 30, wherein the operations further comprise:
notifying an application of the managed preference data and the unmanaged preference data.

40. The computer of claim 30, wherein the operations further comprise:
determining a second unique identifier when another user accesses the computer;
locating a third record with the second unique identifier; and
combining the preference data of the second and third records.

41. The computer of claim 30, wherein the operations further comprise:
removing the managed preference data when environment changes.

42. A system comprising:
a server that hosts a plurality of records, each of which includes preference data and that hosts management information associated with the plurality of records, the management information including policy data; and
a client connected to the server via a network, the client separate from the server, wherein the client comprises:
an environment detector to determine location information, to determine, in the client, a unique identifier for the client in response to activation of a login system of the client computer, the unique identifier being unique to the client such that the unique identifier is determinable before user login on the client, and to retrieve records from a directory service of the server, via the network, based, at least in part, on the location information and the unique identifier;
a cache configured such that access to the records received from the network is through the cache such that the cache operates as a first source of the records received from the network for use in and by the client computer, the cache configured to receive, from internally in the client, computer records and current location records of the client following combining preference data from the retrieved records prior to user login on the client computer, while operably connected to the network, such that the cache is operable to run concurrently a login window of the client and operate on the current location records in the cache;
a compositor to combine preference data from the retrieved records into managed preference data that a user is not allowed to change and unmanaged preference data that a user is allowed to change, based on the policy data; and
a preference system to notify an application at the client of the managed preference data and the unmanaged preference data.

43. The system of claim 42, wherein the compositor is further operable to give precedence to a first item in the preference data over a second item in the preference data based on the policy data.

44. The system of claim 42, wherein the compositor is to resolve a conflict between items in the preference data based on the policy data.

45. The system of claim 42, wherein the compositor is further to perform a union of the management information.

46. The system of claim 42, wherein the compositor is further to designate default preference data when no applicable preference data is found.

47. The system of claim 42, wherein unmanaged preference data is unmodified when the managed preference data is removed.

48. The system of claim 42, wherein the cache is configured to store the managed preference data and the unmanaged preference data.

49. The system of claim 42, wherein the preference system is further to notify the application when the managed preference data or the unmanaged preference data changes.

50. The system of claim 42, wherein the preference system is further to prohibit the user from changing the managed preference data.

51. The system of claim 42, wherein the preference system is further to allow the user to change the managed preference data.

52. The system of claim 42, wherein the compositor is further to remove the managed preference data when the management information changes.

53. A method of managing a client attached to a network, comprising the acts of:
determining, under the control of said client, for said client an identifier unique to said client in response to activating a login system of said client and location information for the client, the unique identifier being determined in said client, the unique identifier being unique to said client such that the unique identifier is determinable before user login on the client;
accessing, under the control of said client, another location on said network to access a record that includes preference data associated with said unique identifier and a record that includes preference data associated with the location information;
retrieving said records of preference data into said client from said network such that said records of preference data are received from said network into the client through a cache of the client such that the cache operates as a first source of said records received from said network for use in and by said client;
combining, in said client, said records of preference data for said client into a first group of preferences for said client that may not be changed by a user, and a second group of preferences that may be changed by a user;
establishing, in said client, controls for said client in accordance with said first and second groups of preferences; and
sending, internally in said client, current computer records and location records of said client to said cache following the combining of said records, while connected to the network prior to user login on the client computer, such that said cache, running concurrently a login window of said client, operates on said current computer and location records in said cache.

54. The method of claim 53, wherein the method includes managing said client configured as a mobile client.

55. The method of claim 54, wherein said established controls for said client are stored in said cache of said client.

56. The method of claim 53, wherein at least a portion of said controls remain in effect on said client when said client is disconnected from said network.

57. The method of claim 1, further comprising:
determining an identifier for a user;
determining a group;
locating a third and a fourth records in a directory service based, at least in part, on the user identifier and the group, respectively; and
retrieving management information associated with the third and fourth records,
wherein the combining also combines the preference data of the first and the second records with the preference data of the third and fourth records in accordance with the management information.

58. The method of claim 1, further comprising checking, in the cache of the client computer, an age of previously cached client computer records and location records and, upon determining that the cached client computer records or the cached location records are out-of-date, updating the cache with the records and the management information.

59. The apparatus of claim 12 further comprising:
means for determining an identifier for a user;
means for determining a group;
means for locating a third and a fourth records in a directory service based, at least in part, on the user identifier and the group, respectively; and
means for retrieving management information associated with the third and fourth records,
wherein the means for combining also combine the preference data of the first and the second records with the preference data of the third and fourth records in accordance with the management information.

60. The apparatus of claim 12 further comprising checking, in the cache of the client computer, an age of previously cached client computer records and location records and, upon determining that the cached client computer records or the cached location records are out-of-date, updating the cache with the records and the management information.

61. The signal-bearing non-transitory storage medium of claim 22 further encoded with instructions executable to:
determine an identifier for a user;
determine a group;
locate a third and a fourth records in a directory service based, at least in part, on the user identifier and the group, respectively; and
retrieve management information associated with the third and fourth records,
wherein the combining also combines the preference data of the first and the second records with the preference data of the third and fourth records in accordance with the management information.

62. The signal-bearing non-transitory storage medium of claim 22 further encoded with instructions executable to update the cache with the records and the management information.

63. The method of claim 53 further comprising:
determining user login information and a group selected by the user;
accessing the another location on the network to access records of preference data associated with the user login information and the group, respectively;
accessing the another location on the network to retrieve management information associated with the records; and
combining the records of preference data in accordance with the management information.

64. The method of claim 1, wherein the method includes managing the client computer configured as a mobile client.

65. The method of claim 1, wherein all records, acquired from the network, that correspond to preference data for managing the client computer, in the client computer, are received from the network into the client computer through the cache of the client computer.

66. The method of claim 1, wherein the combining further comprises resolving conflicts between managed preference data and unmanaged preference data in accordance with the policy data.

67. The method of claim 1, wherein managing, in the client computer, the client computer includes, in accordance with the policy data, designating default management information to be applied if no other applicable management is determined and creating temporary managed preference data that is only in effect when in a specified hierarchical environment.

* * * * *